United States Patent [19]

Brunken et al.

[11] Patent Number: 5,068,132
[45] Date of Patent: * Nov. 26, 1991

[54] METHOD FOR APPLYING A WATER REPELLANT COMPOSITION WITH A WATER CARRIER USING A DISPERSING MEANS

[75] Inventors: Dean E. Brunken, Edmond; Arnulf P. Hagen, Noble, both of Okla.

[73] Assignee: Advanced Chemical Technologies Company, Oklahoma City, Okla.

[*] Notice: The portion of the term of this patent subsequent to Jun. 5, 2007 has been disclaimed.

[21] Appl. No.: 518,062

[22] Filed: May 2, 1990

Related U.S. Application Data

[63] Continuation-in-part of Ser. No. 214,174, Jul. 1, 1988, Pat. No. 4,931,319.

[51] Int. Cl.$^5$ .............................................. B05D 1/02
[52] U.S. Cl. .............................. 427/421; 427/393.4; 427/393.6; 528/10
[58] Field of Search ................. 427/393.4, 393.6, 421; 428/540; 528/10

[56] References Cited

U.S. PATENT DOCUMENTS

4,931,319   6/1990   Stout et al. .......................... 427/421

Primary Examiner—Michael Lusignan
Attorney, Agent, or Firm—Dunlap, Codding, Peterson & Lee

[57] ABSTRACT

A method for treating siliceous and carbon central structures with a water repellant composition wherein an effective amount of water repellant composition is dispersed in water and the mixture then is applied in a continuous process after the mixing to the structure to be treated. The method uses a dispersing agent and/or a dispersing device to effect a more uniform dispersion of the water repellant composition on the structure to be treated.

15 Claims, 3 Drawing Sheets

METHOD FOR APPLYING A WATER REPELLANT COMPOSITION WITH A WATER CARRIER USING A DISPERSING MEANS

CROSS REFERENCE TO RELATED APPLICATIONS

The present application is a continuation-in-part of U.S. Ser. No. 07/214,174 filed July 1, 1988, now U.S. Pat. No. 4,931,319, entitled METHOD FOR APPLYING A WATER REPELLANT COMPOSITION WITH A WATER CARRIER which is hereby incorporated by reference into the present application.

FIELD OF THE INVENTION

The present invention relates generally to methods for applying water repellant compositions to structures and, more particularly, but not by way of limitation, to a method for applying a water repellant composition to a structure utilizing a water carrier.

DESCRIPTION OF THE PREFERRED EMBODIMENTS

The present invention provides a method for treating siliceous structures and/or carbon central structures with a water repellant composition utilizing a water carrier. In accordance with the method of the present invention, an effective amount of water repellant composition is mixed with water and the resulting dispersion of water repellant composition and water is applied to the structure to be treated in a continuous process.

Figure 4:
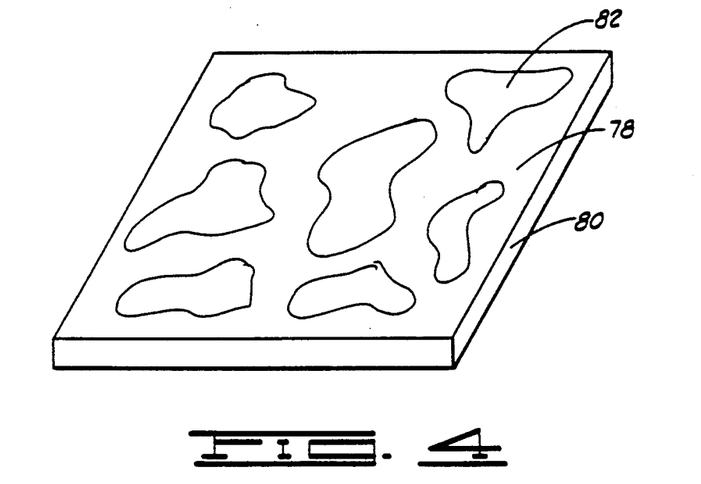
FIG. 4 is a schematic representation of a structure treated with a water repellant composition which does not have substantially uniform water-repellant qualities.
Figure 5:
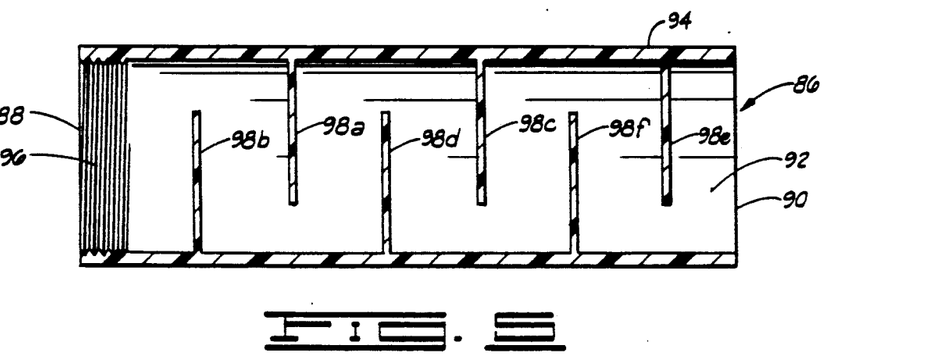
FIG. 5 is a longitudinal cross-section of baffle-type dispersing device used in accordance with a method of the present invention.
Figure 6:
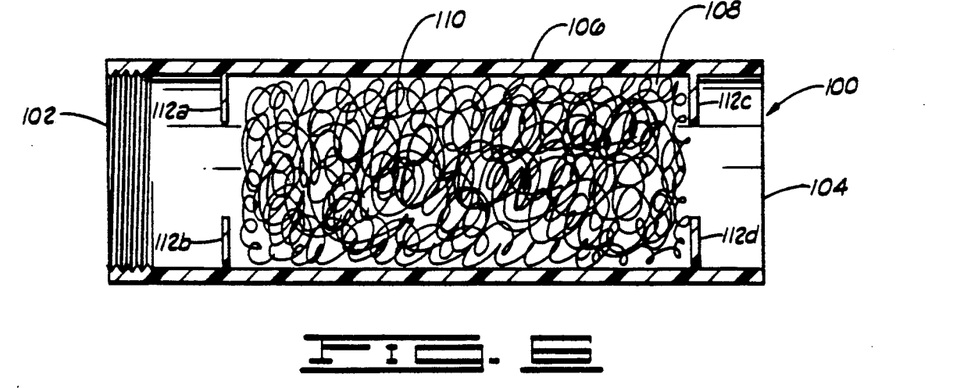
FIG. 6 is a longitudinal cross-section of a mesh-type dispersing device used in accordance with a method of the present invention.

One of the problems in the past with treating these structures with a water repellant composition utilizing a water carrier has been that the treated area on the structure is not as uniformly water repellant as desired. As shown in FIG. 4, a structure 80 treated with a water repellant composition utilizing a water carrier as disclosed herein may leave the structure 80 with substantially non-uniform water-repellant properties. "Non-uniform water-repellant properties" mean areas which have a desired degree of water repellency, and areas which a less than desired degree of water repellency or no water repellency.

For example as shown in FIG. 4, the structure 80 has areas of the desired degree of water repellency 78 and non-water repellant areas 82, creating a splotchy appearance on the structure when water is applied. This lack of uniform water repellency is undesirable since portions of the structure will remain unprotected and exposed to premature aging and/or destruction. The present invention solves this problem by utilizing a dispersing agent and/or a dispersing device to apply the water repellant composition to a structure utilizing a water carrier.

The water repellant compositions used in the present invention can be selected from commercially available water repellant compositions or may comprise a silane or siloxane or combinations thereof (sometimes referred to herein as the active ingredient).

The silane is represented by the general structure or formula:

wherein Si is silicon; O is oxygen; n is a positive integer; and A is selected from the group consisting of H, R, or X,

H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R in the composition.

The siloxane is represented by the general structure or formula:

wherein Si is silicon; O is oxygen; n is a positive integer; and A is selected from the group consisting of H, R,or X, H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein O is oxygen, a carboxylic group, or RNR or RNH wherein N is nitrogen; and with the proviso that at least one A is X, and at least one A is R in the composition.

The water repellant composition may be a substantially pure silane or siloxane or combinations thereof, or the water repellant composition may be a silane or siloxane or combinations thereof in a hydrocarbon, alcohol or other solvent. In one preferred embodiment of the present invention, the water repellant composition is a pure silane or siloxane, not in a hydrocarbon or alcohol or other solvents such as glycol, so the present invention provides a means of applying a silane or siloxane to a structure to be rendered water repellant utilizing a water carrier thereby eliminating the use of hydrocarbon, alcohol or other solvents which may not be desirable in some applications.

A catalyst may be added to the water repellant composition. Effective catalyst can be titanium acetylacetonate (TIAA) or dibutyl tin dilaurate (DBTDL). It has been found that the active ingredient in a pure form or in a medium and a catalyst of only dibutyl tin dilaurate is effective for treating concrete or masonry and the amount of the active ingredient can be substantially reduced. However, this composition was not as effective for treating carbon central structures.

Further, it has been found that the active ingredient in a pure form or in a medium and a catalyst of only titanium acetylacetonate is effective for treating carbon central structures. However, this composition was not as effective for treating siliceous structures.

However, a water repellant composition comprising the active ingredient in a pure form or in a medium and a catalyst of dibutyl tin dilaurate and titanium acetylacetonate has been found to be effective in treating siliceous structures as well as carbon central structures to render such structures water repellant.

The catalyst, dibutyl tin dilaurate and titanium acetylacetonate, can be present in the water repellant composition in a range from less than about one percent (1%) to about twenty-five percent (25%) by weight of the active ingredient. Solutions 5 or emulsions or dispersions containing as little as about one (1%) to about ten (10%) by weight of the active ingredient have been found to be effective for treating siliceous and carbon central structures for rendering such structures substantially water repellant.

The present invention is useful for treating siliceous structures and or carbon central structures having available hydroxy (OH) groups. Siliceous structures include such structures as commonly referred to as concrete and masonry. Carbon central structures as used herein means structures that are characterized by a central carbon atom as opposed to a central silicon atom in siliceous structures, and which have available hydroxy groups. These carbon central structures can be either organic such as leather, paper or wood, or inorganic such as limestone or dolomite. The term "siliceous structure and/or carbon central structure" as used herein includes soil since the present invention also is useful for treating soil for soil stabilization and adobe or ram earth structures because the present invention is useful for treating adobe or ram earth bricks for water repellency.

As used herein "medium" means a carrier such as alcohol, water, hydrocarbon or glycol which may be mixed with the water repellant composition. In the present invention, the water repellant composition is mixed with or dispersed in water and applied to the surface to be treated, and the water repellant composition to be dispersed in the water carrier may be essentially pure or mixed with a medium, as that term "medium" is used herein. The present invention is not limited to any particular medium.

A dispersing agent may be used in accordance with the present invention. A dispersing agent is any agent capable of permitting an enhanced dispersion of the water repellant composition on the structure. "Enhanced dispersion of water repellant composition" means increasing the percentage of area of the desired degree of water repellency on a structure over that area of desired degree of water repellency of a structure which was treated with a water repellant composition utilizing a water carrier without a dispersing agent. When the dispersion of the water repellant composition is enhanced, the structure is more uniformly protected by the water repellant composition.

In a preferred embodiment, the dispersing agent is selected from a group of surfactants capable functioning as the dispersing agent as described herein. These surfactants include, but are not limited to, sodium lauryl sulfate, alkylsulfonates, sorbitan monostearate, sorbitan monolaurate, fluoroalkyl esters, and mixtures thereof. Preferably, a mixture of sodium lauryl sulfate and an alkylsulfonate, or a fluoroalkyl ester such as ZONYL TM (FSN-100 or FSO-100) by Dupont Co. of Wilmington, Delaware is used.

The dispersing agent may be used in any quantity which will permit the water repellant composition to function as described herein. Preferred quantities of dispersing agents are about less than 0.1% to about more than 25% of the weight of the water repellant composition.

The dispersing agent may be added to the water repellant composition; may be added to the water source; or the water repellant composition, water source and dispersing agent mixed simultaneously just prior to application on the structure as described herein. The water source, dispersing agent, and water repellant composition may also be introduced into a dispersing device as described hereafter.

It is important to thoroughly mix the water and the water repellant composition prior to the mixture being applied to the structure to be treated in order to effectively treat the structure to be treated 28, 48 48a, 74 and 74a with water repellant composition. The water serves as a carrier to carry the water repellant composition to the structure to be treated and the water functions to facilitate the penetration of the water repellant composition into the structure to be treated. The water acts as a dilutant to disperse the water repellant composition to substantially prevent co-condensation of the water repellant composition prior to the water repellant composition being applied to the structure to be treated 28; that is, the silane, siloxane or other water repellant composition molecules are highly dispersed in the water and therefore the tendency is for the molecules to react with or adhere to the substrate to be treated rather than with one another to form polymers or otherwise coalesce.

Figure 2A:
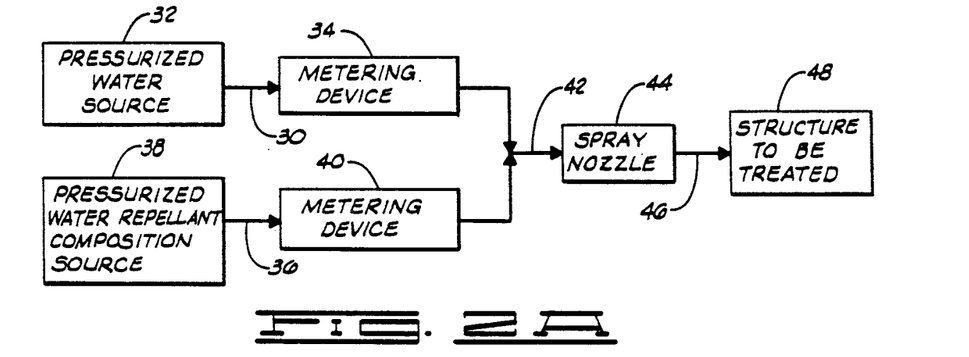
FIG. 2a is a schematic representation of a system showing one other embodiment of the method of the present invention.

To aid in the mixing of the water and the water repellant composition, a dispersing device may be utilized in accordance with a method of the present invention. A dispersing device is any device which is adapted to work in conjunction with a pressurized water source to aid in the mixing of the water source and the water repellant composition so that there is an enhanced dispersion of water repellant composition on the structure, as previously described herein. The dispersing device may also be used in solutions containing water, the water repellant composition and the dispersing agent, as previously described, to further enhance dispersion of the water repellant composition. Examples of dispersing devices are shown in FIGS. 5 and 6.

FIG. 5 shows a longitudinal cross section of a baffle-type dispersing device 86 comprising a first end 88 and a second end 90 having a passageway 92 therethrough. Preferably, the outer periphery 94 is circular in cross-section, and has a diameter about the same size as the connecting pressurized water source such as a garden hose. The distance between the first end 88 and the second end 90 may be any length which permits the dispersing device 86 to function as described herein. A preferred length is about less than 2 inches to about more than 12 inches. The first end 88 is adapted to connect to a pressurized water source such as a garden hose.

Referring to FIG. 4, the first end 88 comprises a threaded portion 96 capable of threadingly engaging a pressurized water source such as a garden hose (not shown). The fluid enters the first end 88 and exits the second end 90. Between the first end 88 and the second end 90 is at least one diverting guide 98*a–f* which functions to disturb the flow of the fluid sufficiently to either substantially mix components in the fluid within the device 86 and/or to increase the turbulence of the exiting fluid. The diverting guides 98*a–f* can be any shape including a curved structure or structures which permit the enhancement of dispersion of the water repellant composition on the structure.

In the preferred embodiment shown in FIG. 6, a longitudinal cross-section of a mesh-type dispersing device 100 comprises a first end 102 engagable with a pressurized water source, and a second end 104. Preferably, the outer periphery 106 is circular in cross-section and is about the same diameter as the pressurized garden hose. A passageway 108 is defined between the first end 102 and the second end 104 in which retainers 112*a–d* serve to hold a mesh-like substance 110 in the passageway 108. Any other appropriate method of retaining the mesh-like substance 110 in the passageway 108 may be used.

The mesh-like substance 110 can be any substance which permits the enhancement of the dispersion of the water repellant composition on the structure. Preferable mesh-like substances are stainless steel wool, or plastic mesh as typically found in scrubbers for dishes.

In one embodiment, the pressurized water source 10 may be the pressurized water source commonly available at water outlets at commercial, residential or other structures. In this embodiment, the pressurized water stream 14 is carried to the venturi-orifice 16 through a common garden hose. There are various and numerous commercially available devices which are connectable to the pressurized water source at commercial, residential or other structures and which include a venturi-orifice as the venturi-orifice 16 and a siphon tube connected to the venturi-orifice 16 wherein the siphon tube is disposable in a container containing a liquid such as the water repellant composition for passing the water repellant composition stream 18 to the venturi-orifice 16. These commercially available devices or dispensers also commonly include metering means such as the metering device 20 for metering the amount of water repellant composition to be passed to the venturi-orifice 16. One commercially available device which might be used in the system illustrated in FIG. 1 is commercially available from Gilmour Manufacturing Company of Summerset, Pennsylvania. An example is referred to by their designation "insecticide and fertilizer sprayer with metering dial". In this embodiment, the present invention contemplates a method for applying water repellant composition to the structure to be treated utilizing a commercially available sprayer connected to a garden hose which is connected to the pressurized water source at a commercial or residential or other structure.

Nothing stated herein should be interpreted to mean or infer that commercially available sprayers have been used in the past for applying water repellant composition. Such sprayers commonly have been used for applying herbicides, insecticides or fertilizers to living foliage.

As illustrated in FIG. 1, the method of the present invention is carried out by providing a pressurized water source 10 and a water repellant composition source 12. A pressurized water stream 14 is passed from the pressurized water source 10 into a venturi-orifice 16. A water repellant composition stream 18 is passed from the water repellant composition source 12 through a metering device 20 into the venturi-orifice 16. The dispensing agent of the present invention may be mixed with the water repellant composition source 12. Also, the dispensing device of the present invention may be positioned between the venturi-orifice 16 and the spray nozzle 24, or the dispensing device may take the place of the spray nozzle 24.

The metering device 20 meters the amount of water repellant composition or water repellant composition and dispersing agent being passed from the water repellant composition source 12 into the venturi-orifice 16. The water in the water stream 14 is mixed with the water repellant composition or water repellant composition and dispersing agent in the water repellant composition stream 18 in the venturi-orifice 16 and the mixture comprising the water and the water repellant composition, or water, water repellant composition and dispersing agent is passed from the venturi-orifice 16 in a stream 22 and through a spray nozzle 24 (and/or dispensing device (not shown)).

The mixture comprising the water repellant composition and water, or water, water repellant composition, and dispersing agent is passed from the spray nozzle 24 or dispersing device (not shown) in a stream 26 onto the structure to be treated designated in FIG. 1 by the reference numeral 28.

The venturi-orifice 16 utilizes the pressure in the pressurized water source 10 to pump or suck the water repellant composition or water repellant composition and dispensing agent from the water repellant source 12 through the metering device 20. The venturi-orifice 16 may be a typical venturi structure or may simply comprise an orifice. The venturi-orifice 16 also functions to facilitate the thorough mixing of the water and the water repellant composition. The venturi-orifice 16 also may function as the spray nozzle 24 and, in this instance, the spray nozzle 24 may be eliminated.

Schematically shown in FIG. 2*a* is one other embodiment of the method of the present invention. As shown in FIG. 2*a*, a water stream 30 is passed from a pressurized water source 32 through a metering device 34. A pressurized water repellant composition stream 36 is passed from a pressurized water repellant composition source 38 through a metering device 40. The pressurized water stream 30 and the pressurized water repellant composition stream 36 are combined for mixing the water repellant composition with the water, and a combined water and water repellant composition stream 42 is passed through a spray nozzle 44. A combined water and water repellant composition stream 46 is passed from the spray nozzle 44 onto a structure to be treated 48.

A dispersing device (not shown) may be positioned between the metering devices 34 and 40 and the spray nozzle 44 or the spray nozzle 44 may be eliminated with the dispersing device functioning as the spray nozzle 44. Also, a dispersing agent may be mixed with the pressurized water source 32 and/or the pressurized water repellant composition source 38 or be introduced separately as shown in FIG. 2b.

Figure 2B:
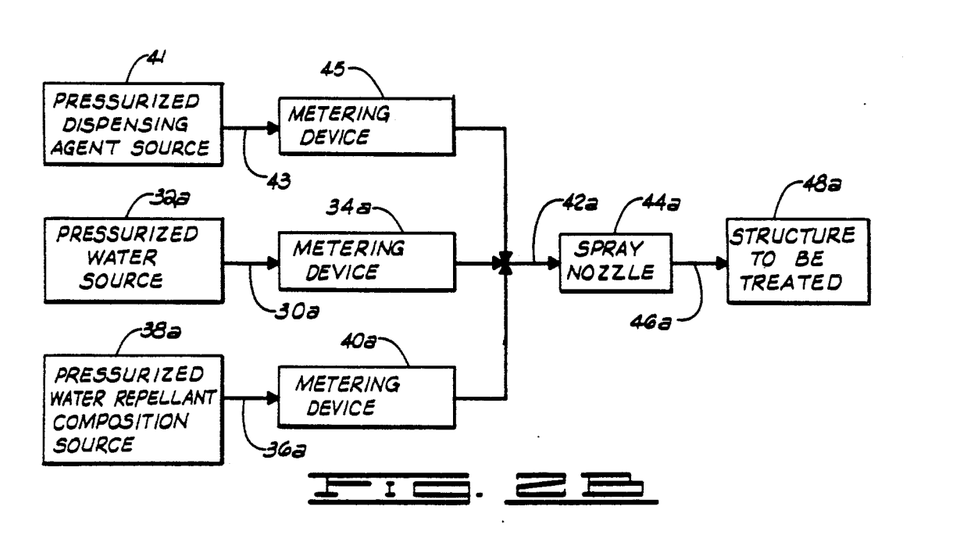
FIG. 2b is a schematic representation of a system showing one other embodiment of the method of the present invention.

Schematically shown in FIG. 2b is one other embodiment of the method of the present invention. As shown in FIG. 2b, a water stream 30a is passed from a pressurized water source 32a through a metering device 34a. A pressurized water repellant composition stream 36a is passed from a pressurized water repellant composition source 38a through a metering device 40a. A pressurized dispersing agent stream 43 is passed from a pressurized dispersing agent source 41 through a metering device 45.

The pressurized water stream 30a, the pressurized water repellant composition stream 36a, and the pressurized dispersing agent stream 43 are combined for mixing the water repellant composition and dispersing agent with the water, and a combined water, dispersing agent and water repellant composition stream 42a is passed through a spray nozzle 44a. A combined water, dispersing agent and water repellant composition stream 46a is passed from the spray nozzle 44a onto a structure to be treated 48a. Also, a dispersing device (not shown) may be positioned to receive stream 42a and feed same to the spray nozzle 44a, or the spray nozzle 44a may be eliminated by the use of the dispersing device.

Figure 3A:
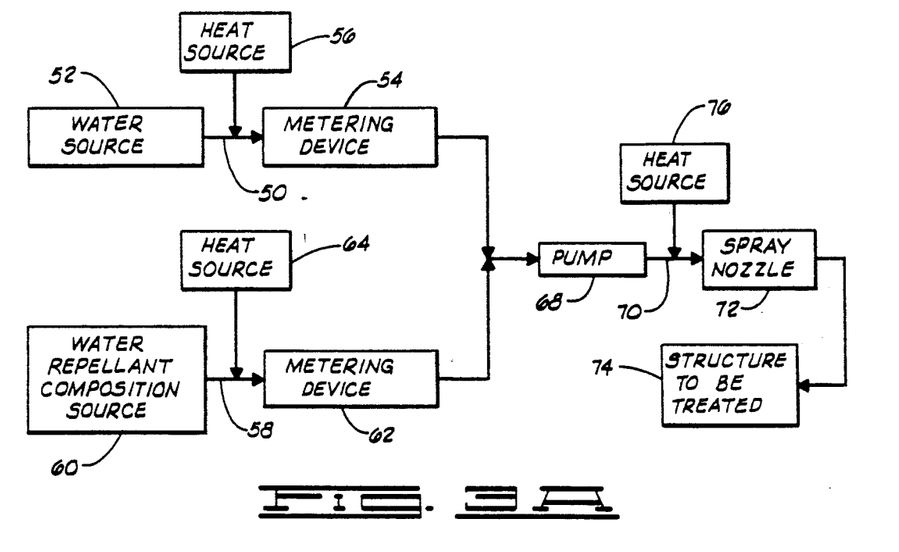
FIG. 3a is a schematic representation of yet another embodiment of the method of the present invention.

One other embodiment illustrating the method of the present invention is shown in FIG. 3a wherein a water stream 50 is supplied from a water source 52 through a metering device 54. Heat from a heat source 56 is applied to the water stream 50 for heating the water stream 50 which may be desired in some applications. A water repellant composition stream 58 is supplied from a water repellant composition source 60 through a metering device 62. Heat from a heat source 64 is applied to the water repellant composition stream 58 for heating the water repellant composition. A dispersing agent may be mixed with either or both of the water source 52 or the water repellant composition source 60. Also, a dispersing device (not shown) may be positioned to receive stream 70 and feed same into the spray nozzle 72. Alternatively, the spray nozzle 72 may be replaced by the dispersing device totally.

The water supply stream and the water repellant composition stream are passed into each other and mixed to some degree to form a mixture of water and water repellant composition (which may also contain a dispersing agent) stream 66 which is supplied to the inlet of a pump 68. The pump 68 pumps the mixture of water and water repellant composition and outputs a dispersion of water and water repellant composition stream 70 which is passed through a nozzle 72 and applied to a structure to be treated 74. In addition to providing a source of energy for pumping the mixture of water and water repellant composition, the pump 68 also functions to complete the thorough mixing of the water and the water repellant composition prior to the mixture being applied to the structure to be treated 74.

Figure 3B:
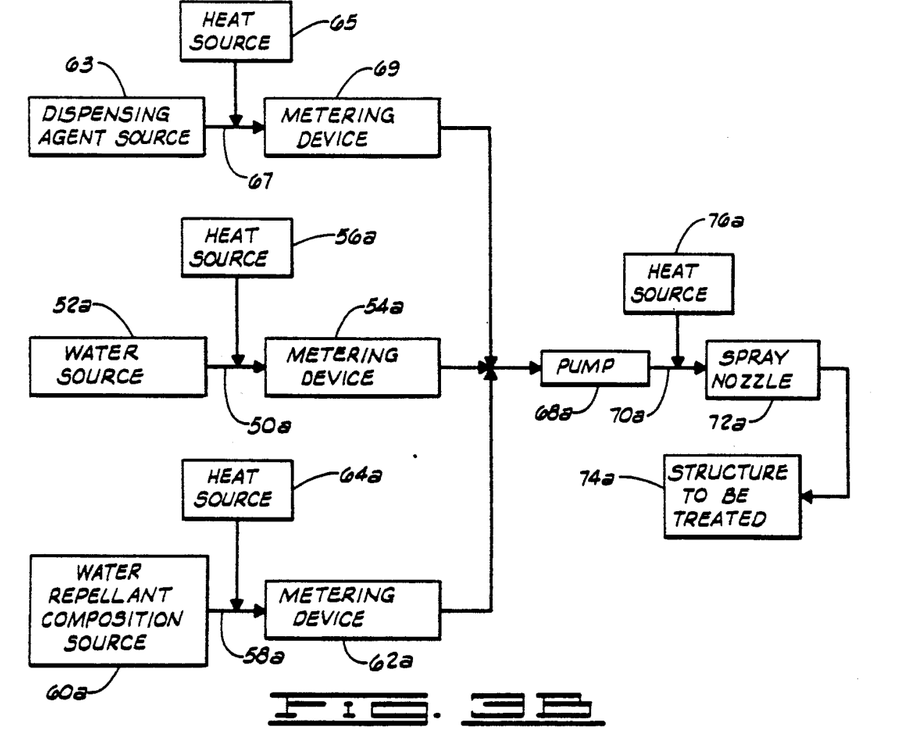
FIG. 3b is a schematic representation of yet another embodiment of the method of the present invention.

As shown in FIG. 3a, heat from a heat source 76 is applied to the mixture stream 70 for heating the mixture stream 70 prior to the mixture stream 70 being applied to the structure to be treated which may be desired in some instances. FIG. 3B shows a separate source for the dispersing agent which is separately heated by heat source 65 and separately metered by metering device 69.

It should be noted that it may be desirable in some applications to eliminate any or all of the heat sources 56, 64, 65 or 76. For example, only the heat source 76 may be required in some applications or only the heat source 56 may be required in some applications or only the heat source 56 and 64 may be required in some applications.

Figure 1:
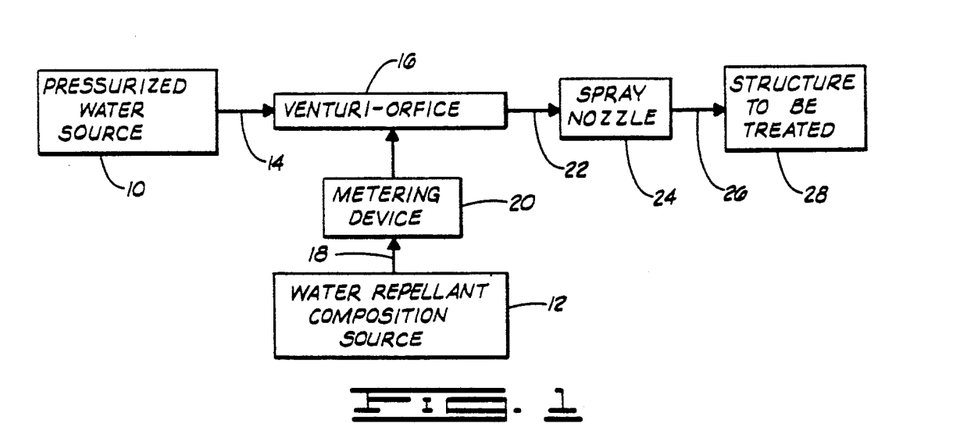
FIG. 1 is a schematic representation of one embodiment of the method of the present invention.

The term "water source" is used herein in connection with the water sources 10, 32 and 52 shall include steam since in some instances it may be desirable to use steam as the medium for mixing with the water repellant composition to be applied to the structure to be treated.

In its simplest form, the present invention comprises adding a portion of water repellant composition, a portion of water and a portion of dispersing agent to a container, agitating the container, and immediately pouring or spraying the resulting dispersion onto the surface to be rendered water repellant.

Where the mixture of water and water repellant composition is applied under pressure either because the water source is pressurized or because the water repellant composition source is pressurized or both or because the mixture is pumped and outputted under pressure, it may be possible to eliminate the cleaning of the surface of the structure to be treated utilizing the process of the present invention. The pressurized mixture of water and water repellant composition applied to the structure to be treated simultaneously would clean the surface of the structure to be treated sufficiently to permit the water repellant composition to migrate into the structure to be treated. It is not necessary that the surface of the structure to be treated be cleaned in an ordinary since, but rather that the debris be moved so that the water repellant composition will have access to the surface of the structure to be treated for proper application.

In accordance with the present invention, the mixture of water and water repellant composition or water, water repellant composition and dispersing agent is applied to the structure to be treated in a continuous process about immediately after mixing the water and the water repellant composition. In some instances, depending on the length of conduits or hoses, various times will elapse between the mixing of the water and the water repellant composition and the applying of the mixture to the structure to be treated. The exact time is not significant as long as the mixture is applied in a substantially continuous process after the mixing of the water and water repellant composition at the site. The mixture of water and water repellant composition or water, water repellant composition and dispersing agent is applied to the structure to be treated prior to substantial co-condensation of the water repellant composition In other words, the silane or siloxane, or other water repellant composition molecules are highly dispersed in the water and therefore the tendency is for the silane or other molecules to react with or adhere to the substrate to be treated rather than with one another to form polymers or otherwise coalesce. In most applications, it is contemplated that the mixture or dispersion of water and water repellant composition or water, water repellant composition and dispersing agent will be applied to the structure to be treated within a time range from about less than five seconds to about less than five minutes.

In some applications, the water and the water repellant composition or water, water repellant composition and dispersing agent may be mixed at the site, temporarily stored in a chamber at the site and subsequently applied to the structure to be treated and, in this instance, this is considered to be applied in a continuous process at the site. The use of the term "in a continuous process at the site" as used herein is intended to distinguish the present process from applications where water repellant composition and water are mixed in some manner, stored in containers and shipped to the site for subsequent application to the structure to be treated. The methods of the present invention do not include or encompass the method just described in the last preceding sentence.

Utilizing a silane of the structure described before, it also has been discovered that the depth of penetration of the silane into the structure to be treated can be increased by applying subsequent coats of the silane to the surface of the structure to be treated. In this application, the silane is applied to the surface of the structure to be treated and after waiting at least a few minutes for the structure to appear dry, a second coat of silane is applied to the surface of the structure to be treated. Subsequent coats can be applied in a similar manner for still further increasing the depth of penetration of the silane into the structure to be treated.

This technique of increasing the depth of penetration can be used in conjunction with the methods described before in connection with FIGS. 1, 2a, 2b, 3a and 3b and this technique of increasing the depth of penetration by applying subsequent coats of the silane to the surface of the structure to be treated can be used in connection with applying either pure silane or silane in solution with a medium without the water mixing step described before in connection with FIGS. 1, 2a, 2b, 3a and 3b, or the water mixing step may be utilized for the first application for simultaneously cleaning the surface of the structure to be treated.

Using the device shown in FIG. 1, a Gilmour sprayer utilizing a pressurized water source of a ⅝" garden hose having about 45-50 psi, a series of concrete cupcake shaped concrete blocks were treated. After treatment they were air cured at room temperature for 48 hours, weighed, and immersed in water. After 48 hours they were towel dried and weighed. The percentage reduction in water gain is calculated based on the weight gain of an untreated cupcake.

| Test | Silane* (vol %) | Dispersing Agents (% wt) | % Water gain reduction |
|---|---|---|---|
| 1 | 10 | 0.1% Zonyl FSN 100 | 63 |
| 2 | 14 | 1% DBTDL 1% TIAA 0.5% Ivory Liquid | 80 |
| 3 | 14 | 1% DBTDL 1% TIAA 0.5% Ivory Liquid | 80 |
| 4 | 14 | 0.1% Zonyl FSN 100 | 75 |

*Isobutyltrimethoxy silane

In one embodiment, a steam cleaning unit is fitted with a chemical feed system of either a pump or venturi type commonly used to supply detergents or acid/alkali solutions for cleaning masonry structures such as reinforced concrete bridge decks. The steam cleaning unit may be of the type described in U.S. Pat. No. 3,819,400, issued to Plankl, et al., June 25, 1974, for example. In this instance, the chemical being fed into the steam stream is the water repellant composition. The unit thus equipped is used to treat a dirty reinforced concrete bridge deck by forcing the water repellant composition into the concrete to a depth of about ⅛ of an inch or more, using the heat and pressure of the steam jet to move the dirt, oils, films and other contaminants while causing the water repellant composition to rapidly migrate into the concrete structure. After the water repellant composition has reacted, the outer ⅛ of an inch of the structure becomes extremely dry due to its inherent hydrophobic nature imparted by the water repellant composition. A number of applications of solvent (medium) solutions of silane water repellant composition can then be sprayed onto the cleaned (pores opened) and hydrophobically dry surface to facilitate penetration possibly down to and below the reinforcing steel. In this manner, a concrete bridge deck can become permanently resistant to steel corrosion and salt and water and freeze thaw attack. Existing methods require expensive cleaning followed by heavy coatings with water repellant materials. These existing methods are limited by the wear resistance of the coating. The cleaning and traffic control presently accounts for most of the treatment expense. The present invention will provide much longer lasting and more effective protection for the same or lesser cost.

In another embodiment, a Gilmour sprayer of the type described before can be used to apply a 3% to 5% dispersion of silane in water providing substantial depth of penetration and long term protection, followed by a second treatment with about 1% to about 2% dispersion or less of siloxane in water to improve the appearance or beading effect (contact angle). The second treatment might be repeated every few years to revitalize the beading effect.

Changes may be made in the steps or in the sequence of steps of the methods described herein without departing from the spirit and scope of the invention as defined in the following claims.

What is claimed is:

1. A method for treating siliceous and/or carbon central structures at a site with a water repellant composition comprising the steps of:

mixing an effective amount of water repellant composition with water to obtain a dispersion of water and water repellant composition;

sufficiently further dispersing the water repellant composition in order to enhance the area of the structure treated with the water repellant composition;

applying the dispersion of water repellant composition and water to the structure in a continuous process at the site immediately within about 5 sec- onds after the water repellant composition and the water are mixed; and wherein the water repellant composition comprises a silane or siloxane or combinations thereof and, wherein the silane has the general formula:

a silane or a siloxane or combination thereof; and wherein the silane has the general formula:

wherein the siloxane has the general formula:

wherein Si is silicon; O is oxygen; n is a positive integer; and A is selected from the group consisting of H, R, or X, H is a hydrogen atom;

R is selected from the group consisting of an alkyl containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains up to about 8 carbon atoms and the alkenyl substituent contains up to about 8 carbon atoms;

X is selected from a group consisting of a halogen, hydroxyl group, OR group wherein 0 is oxygen, a carboxylic group, or RNR or RNH wherein N is nitrogen; and with the proviso that at least one A is X, and at least one A is R in the composition.

2. The method of claim 1 wherein the water repellant composition is further dispersed by disposing an effective amount of a dispersing agent in the water repellant composition capable of dispersing the water repellant composition sufficiently to enhance the area of the structure treated with the water repellant composition.

3. The method of claim 1 wherein the water repellant composition is further dispersed by disposing an effective amount of a dispersing agent in the water capable of dispersing the water repellant composition sufficiently to enhance the area of the structure treated with the water repellant composition.

4. The method of claim 1 wherein the water repellant composition is further dispersed by mixing simultaneously the water, water repellant composition and a dispersing agent, wherein the dispersing agent is capable of dispersing the water repellant composition sufficiently to enhance the area of the structure treated with the water repellant composition.

5. The method of claim 1 wherein the water repellant composition is further dispersed by introducing the water repellant composition through a dispersing device capable of dispersing the water repellant composition sufficiently to enhance the area of the structure treated with the water repellant composition.

6. The method of claim 5 wherein the water repellant composition is further dispersed by introducing the water repellant composition and a dispersing agent through the dispersing device.

7. The method of claim 1 wherein the step of mixing the water repellant composition with the water is defined further to include:

passing water under pressure via a water stream;

passing the water repellant composition into the water stream for mixing with the water; and wherein the step of applying the dispersion to the structure is defined further to include the step:

passing the dispersion of water repellant composition and water under pressure onto the structure.

8. The method of claim 1 wherein the step of mixing the water repellant composition with the water is defined further to include the steps of:

passing water under pressure through a venturi-orifice;

passing the water repellant composition into the water in the venturi-orifice for mixing with the water to form the dispersion of water and water repellant composition; and passing the dispersion of water repellant composition and water from the venturi-orifice to the structure to be treated.

9. The method of claim 8 defined further to include the step of:

passing the dispersion of water and water repellant composition through a spray nozzle, and the dispersion of water and water repellant composition from the spray nozzle being passed onto the structure to be treated.

10. The method of claim 8 defined further to include the step of:

metering the water repellant composition passed to the venturi-orifice for mixing a predetermined amount of water repellant composition with the water being passed through the venturi-orifice.

11. The method of claim 1 wherein the step of mixing the water repellant composition with water is defined further to include the steps of:

passing water in a water stream to a pump;

passing water repellant composition in a water repellant composition stream to the pump;

combining the water stream and the water repellant composition stream prior to or simultaneously with passing the water and the water repellant composition to the pump; and passing the dispersion of water and water repellant composition to the pump;

pumping the dispersion of water and water repellant composition through a spray nozzle for spraying the dispersion of water and water repellant composition onto the structure to be treated.

12. The method of claim 11 defined further to include the step of:

metering the water in the water stream to provide a predetermined amount of water prior to mixing the water and the water repellant composition.

13. The method of claim 11 defined further to include the step of metering the water repellant composition prior to mixing the water and the water repellant composition for providing a predetermined amount of water repellant composition for mixing with the water.

14. The method of claim 1 wherein the step of mixing the water repellant composition with the water is defined further to include the steps of:

passing water repellant composition under pressure via a water repellant composition stream;

passing water in a water stream;

mixing the water with the water repellant composition under pressure for mixing the water repellant composition with the water to form the dispersion of water and water repellant composition; and wherein the step of applying the dispersion to the structure is defined further to include the step of passing the dispersion of water repellant composition and water under pressure onto the structure to be treated.

15. The method of claim 1 defined further to include the step of:

applying a subsequent application of water repellant composition to the structure to be treated.

* * * * *